(12) United States Patent
Sandhu et al.

(10) Patent No.: US 7,769,107 B2
(45) Date of Patent: Aug. 3, 2010

(54) SEMI-BLIND ANALOG BEAMFORMING FOR MULTIPLE-ANTENNA SYSTEMS

(75) Inventors: Sumeet Sandhu, San Jose, CA (US); William J. Chimitt, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1807 days.

(21) Appl. No.: 10/866,321

(22) Filed: Jun. 10, 2004

(65) Prior Publication Data

US 2005/0277423 A1    Dec. 15, 2005

(51) Int. Cl.
- H04B 7/08 (2006.01)
- H03D 3/00 (2006.01)
- H03K 9/06 (2006.01)

(52) U.S. Cl. .......... 375/316; 375/322; 375/346; 375/348; 455/132; 455/134; 455/135; 455/139

(58) Field of Classification Search ......... 375/142, 375/143, 145, 147, 150, 316; 455/130, 132–135, 455/137

See application file for complete search history.

(56) References Cited

U.S. PATENT DOCUMENTS

| | | | |
|---|---|---|---|
| 5,809,422 A * | 9/1998 | Raleigh et al. | 455/449 |
| 6,452,988 B1 * | 9/2002 | Hayward | 375/346 |
| 6,598,009 B2 * | 7/2003 | Yang | 702/152 |
| 6,694,154 B1 * | 2/2004 | Molnar et al. | 455/562.1 |
| 6,785,520 B2 * | 8/2004 | Sugar et al. | 455/101 |
| 6,973,314 B2 * | 12/2005 | Wilson et al. | 455/452.1 |
| 7,027,421 B2 * | 4/2006 | Park et al. | 370/335 |
| 7,184,506 B2 * | 2/2007 | Kolze | 375/371 |
| 7,242,724 B2 * | 7/2007 | Alexiou et al. | 375/267 |
| 7,260,370 B2 * | 8/2007 | Wang et al. | 455/135 |
| 7,359,520 B2 * | 4/2008 | Brennan et al. | 381/92 |
| 7,426,232 B2 * | 9/2008 | Matsuoka et al. | 375/148 |
| 2002/0042256 A1 * | 4/2002 | Baldwin et al. | 455/232.1 |
| 2002/0169578 A1 * | 11/2002 | Yang | 702/152 |
| 2003/0063759 A1 * | 4/2003 | Brennan et al. | 381/92 |
| 2003/0069047 A1 * | 4/2003 | Kitahara | 455/562 |
| 2004/0131011 A1 * | 7/2004 | Sandell et al. | 370/210 |
| 2004/0192389 A1 * | 9/2004 | Kim et al. | 455/561 |
| 2004/0204098 A1 * | 10/2004 | Owen | 455/561 |
| 2004/0219899 A1 * | 11/2004 | Ho et al. | 455/273 |
| 2004/0228420 A1 * | 11/2004 | Chul | 375/267 |
| 2005/0001765 A1 * | 1/2005 | Ryu et al. | 342/377 |
| 2005/0036573 A1 * | 2/2005 | Zhang et al. | 375/343 |
| 2005/0125597 A1 * | 6/2005 | Lovett | 711/106 |
| 2006/0067443 A1 * | 3/2006 | Liu et al. | 375/347 |
| 2007/0178862 A1 * | 8/2007 | Winters et al. | 455/135 |
| 2009/0060107 A1 * | 3/2009 | Fischer et al. | 375/355 |
| 2009/0135954 A1 * | 5/2009 | Salhov et al. | 375/317 |

OTHER PUBLICATIONS

Jeon, S , et al., "A Novel Smart-Antenna System Implementation for Broadband Wireless Communications", *IEEE Trans. on Antennas and Propagation*, 50, (2002),600-606.

Wittenben, A , et al., "On the Potential of Adaptive Antenna Combining for Intersymbol Interference Reduction in High-Speed Wireless LANs", *Vehicular Technology Conference*, (1997),627-631.

* cited by examiner

*Primary Examiner*—David C Payne
*Assistant Examiner*—Linda Wong
(74) *Attorney, Agent, or Firm*—Thorpe North and Western LLP

(57) ABSTRACT

Complex antennas weights for use in beamforming in a multiple-antenna system are determined based upon clear channel assessment (CCA) information in a wireless networking environment.

19 Claims, 5 Drawing Sheets

SEMI-BLIND ANALOG BEAMFORMING FOR MULTIPLE-ANTENNA SYSTEMS

TECHNICAL FIELD

The invention relates generally to wireless communication and, more particularly, to methods and structures for determining beamforming weights in multiple-antenna wireless systems.

DETAILED DESCRIPTION

Figure 1:
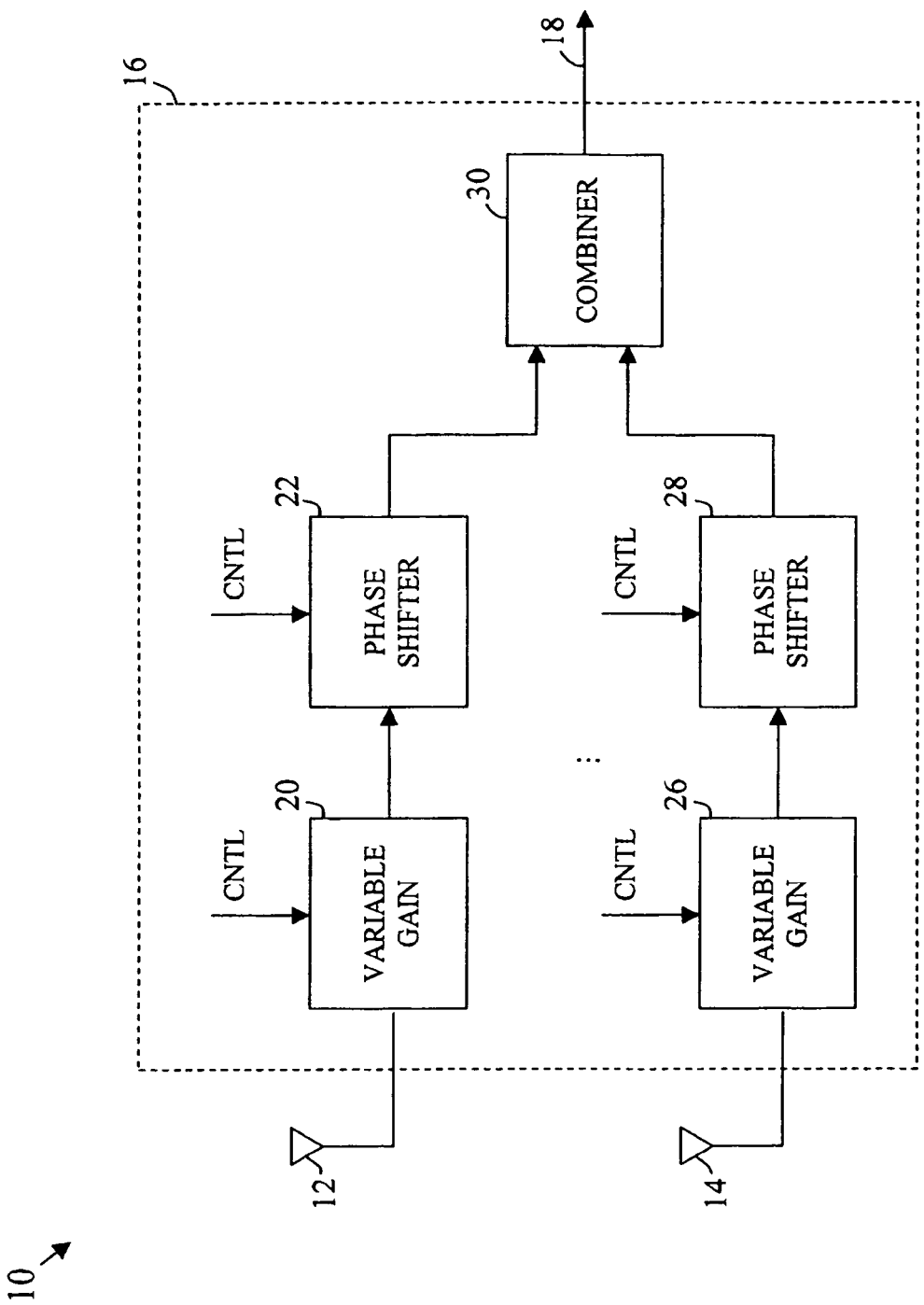
FIG. 1 is a block diagram illustrating an example receive beamforming arrangement for use in a multiple-antenna wireless communication apparatus in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example receive beamforming arrangement 10 for use in a multiple-antenna wireless communication apparatus in accordance with an embodiment of the present invention. As shown, the receive beamforming arrangement 10 may include at least two antennas 12, 14 and a receive beamformer 16. The at least two antennas 12, 14 are operative for receiving wireless signals from one or more remote sources. Any type of antennas may be used including, for example, dipoles, patches, helical antennas, antenna arrays, and/or others. The receive beamformer 16 is operative for combining the signals received by the at least two antennas 12, 14 in a manner that may enhance the ability of the wireless apparatus to accurately decode the signals. The output 18 of the receive beamformer 16 may be delivered to, for example, a radio frequency (RF) receiver and/or additional receive processing functionality.

As illustrated in FIG. 1, the receive beamformer 16 may include: a first variable gain unit 20 and a first phase shifter 22 that are associated with the first antenna 12, a second variable gain unit 26 and a second phase shifter 28 that are associated with the second antenna 14, and a combiner 30. The first variable gain unit 20 and the first phase shifter 22 are operative for amplifying and phase shifting, respectively, a signal received by the first antenna 12 before the signal reaches the combiner 30. Likewise, the second variable gain unit 26 and the second phase shifter 28 are operative for amplifying and phase shifting, respectively, a signal received by the second antenna 14 before the signal reaches the combiner 30. The combiner 30 then combines the two amplified, phase shifted receive signals in a predetermined manner. In at least one embodiment, the combiner 30 is a summation device that simply adds the various inputs together. One or more additional antennas, with corresponding variable gain units and phase shifters, may be added to the receive beamforming arrangement 10. In addition, it should be understood that other functionality may also be present within the receive beamforming arrangement 10. For example, in at least one embodiment, a filter (e.g., a preselector, etc.) may be placed between each antenna 12, 14 and the receive beamformer 16 to appropriately filter the corresponding receive signal before beamforming occurs. Also, in some embodiments, some or all of the RF receiver processing (e.g., downconverion, filtration, further amplification, etc.) may be performed within each antenna channel before the combiner 30. In one possible variation, the combiner 30 combines baseband signals. Other modifications and variations are also possible.

The variable gain units 20, 26 are each capable of providing a variable amount of gain to a corresponding receive signal in response to control information received at an input thereof. The variable gain units 20, 26 may be, for example, low noise amplifiers (LNAs) having controllable gain. In other embodiments, a separate LNA may be provided in each antenna channel before a corresponding variable gain unit 20, 26. The phase shifters 22, 28 are each capable of providing a variable phase shift to a corresponding receive signal in response to control information received at an input thereof. The variable gain unit 20, 26 and the phase shifter 22, 28 associated with a particular antenna 12, 14 may be used to apply a complex weight W to a corresponding receive signal (where the magnitude |W| of the weight is related to the gain and the angle $\phi$ of the weight is related to the phase). It should be appreciated that other structures for applying complex weights to receive signals in a multiple-antenna system also exist. In at least one aspect of the present invention, techniques and structures for determining the complex weights to apply to receive signals in a multiple-antenna system are provided.

Figure 2:
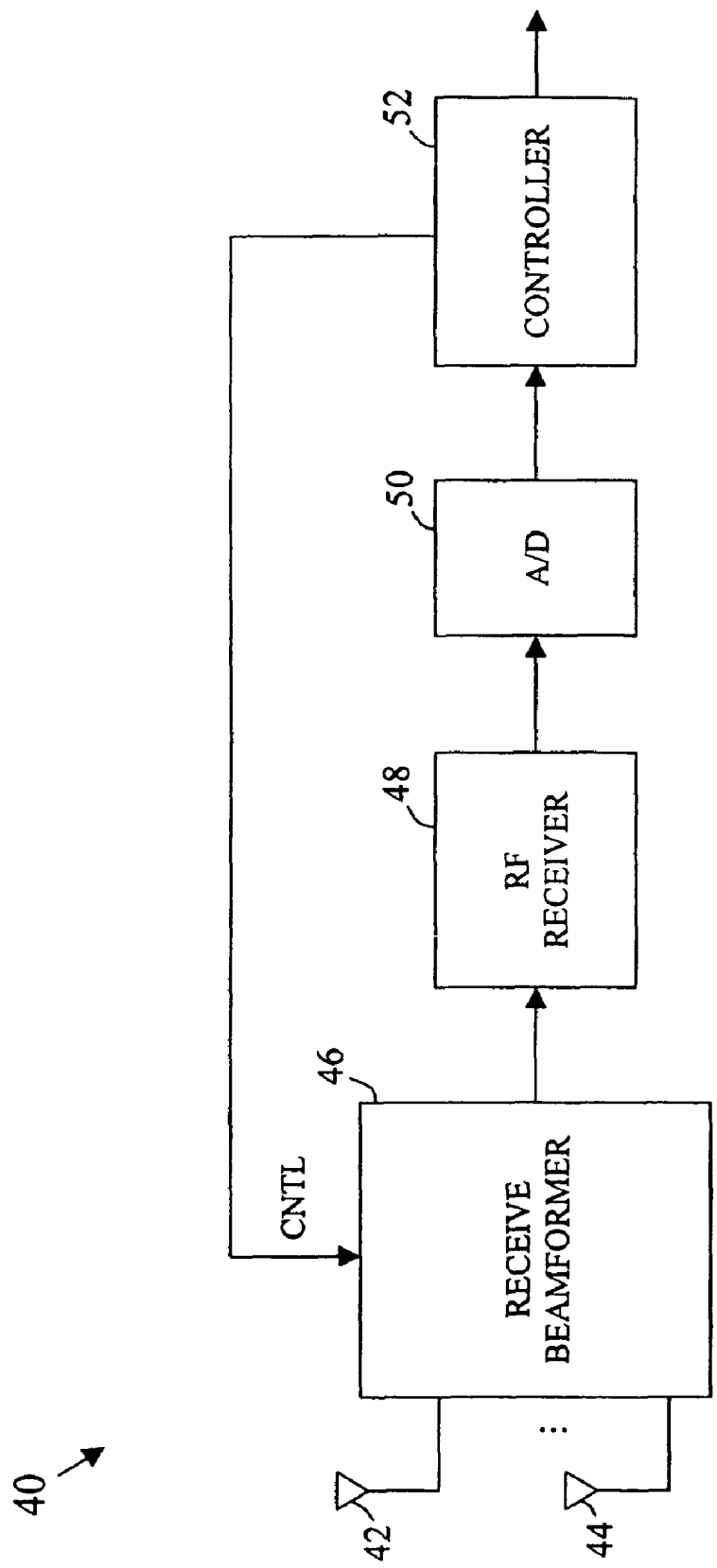
FIG. 2 is a block diagram illustrating an example wireless apparatus in accordance with an embodiment of the present invention.

FIG. 2 is a block diagram illustrating an example wireless apparatus 40 in accordance with an embodiment of the present invention. As shown, the wireless apparatus 40 may include: two or more antennas 42, 44, a receive beamformer 46, an RF receiver 48, an analog to digital (A/D) converter 50, and a controller 52. The receive beamformer 46 may be similar to the receive beamformer 16 of FIG. 1 (although other beamformer architectures may alternatively be used). The two or more antennas 42, 44 receive wireless signals from a wireless channel. The receive beamformer 46 then applies complex weights to the receive signals and combines the weighted signals. The RF receiver 48 processes the combined RF signal to convert it to a baseband signal. The A/D converter 50 then converts the baseband signal to a digital format so that further processing may be performed digitally. The controller 52 is operative for, among other things, generating the complex weights to be applied to the receive signals within the receive beamformer 46. The controller 52 may be implemented using a digital processing device such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above.

The RF receiver 48 may be any type of receiver including, for example, a super heterodyne receiver, a direct conversion receiver, etc. The RF receiver 48 may include, for example, functionality for downconverting the combined signal (in one more different steps), for filtering the signal (e.g., intermediate frequency (IF) filtering, baseband filtering, etc.), for amplifying the signal (e.g., IF amplification, baseband amplfication, etc.), for performing automatic gain control (AGC), and/or for performing other RF receiver related functions. As described previously, in some embodiments, some or all of these receiver functions may be performed before the antenna receive signals are combined (e.g., in an apparatus that uses the beamformer architecture of FIG. 1, before the combiner 30). For example, in one possible approach, downconversion to IF is performed before the antenna receive signals are combined. As will be appreciated, many different beamformer/receiver architectures may be used in accordance with the invention. In at least one embodiment of the present invention, the RF receiver 48 may include separate in-phase (I) and quadrature (Q) receive channels for performing the receiver functions (e.g., in a system that uses quadrature amplitude modulation (QAM)). In such an embodiment, the A/D converter 50 may include separate converters for the I and Q channels.

In at least one embodiment of the present invention, the wireless apparatus 40 is adapted for use in a wireless network following the IEEE 802.11 wireless networking standard (ANSI/IEEE Std 802.11-1999 Edition and its progeny). The IEEE 802.11 standard defines a clear channel assessment (CCA) function that is used to determine whether a wireless medium is presently occupied (i.e., whether there is currently a packet on-air in a particular wireless channel). This function may be used by a station to determine whether, for example, it is appropriate to transmit onto the wireless medium at a particular point in time. As part of the CCA function, an autocorrelation (or a partial autocorrelation) of a received signal (e.g., a "short preamble" portion of a received packet) may be calculated to generate CCA information. In another approach, a short preamble of a received packet may be correlated with a reference that includes at least a portion of a known preamble sequence to generate CCA information. The CCA output for an antenna is a function of the wireless channel corresponding to that antenna and is a good indicator of the channel quality associated with the antenna. In a multiple-antenna system, a CCA determination may be made for each of the corresponding antennas. In one possible approach, an autocorrelation-based CCA determination for a receive antenna may be made as follows. The signal portion $s_n^m$ of a received signal follows the relationship:

$$s_n^m = \sum_{l=1}^{L} h_l^m x_{n-l}$$

where x is the transmitted short preamble signal and $h^m$ is the L-tap frequency selective channel on the $m^{th}$ receive antenna. The signal $y_n^m$ received by the $m^{th}$ receive antenna is:

$$y_n^m = (s_n^m + v_n^m) e^{j\omega_0 n}$$

where v is the noise at the receiver and $\omega_0$ is the carrier frequency offset. The autocorrelation statistic r used to perform CCA may be calculated as follows:

$$r_n^m = \frac{1}{D} \sum_{k=0}^{D-1} y_{n-k}^m \, conj(y_{n-k-C}^m)$$

where conj(x) is the conjugate of x, C describes the periodicity of the short training, and D defines the length of integration of the autocorrelation output. Other techniques for calculating the CCA statistic may alternatively be used.

For the CCA statistic above, the mean of the CCA statistic may be calculated over multiple D-long segments as:

$$a^m = E[r_n^m] = e^{j\omega_0 C} \frac{1}{D} \sum_{k=0}^{D-1} E|s_{n-k}^m|^2 \approx e^{j\omega_0 C} \sigma_x^2 \sigma_m^2$$

where $\sigma_m^2$ is the norm of the $m^{th}$ channel and $\sigma_x^2$ is the norm of one segment of the short preamble. The mean of the CCA statistic for a receive antenna is a function of the channel power for that antenna. Therefore, by evaluating the CCA statistic on each receive antenna of a multiple-antenna system, an estimate of the channel power on each receive antenna may be obtained. In at least one embodiment of the present invention, this CCA information is used to determine complex weights for the various antennas of a multiple antenna system.

In at least one embodiment of the present invention, the controller 52 may be programmed to calculate a CCA statistic for each receive antenna 42, 44 of the multiple-antenna system. These CCA statistics may then be used by the controller 52 to set the magnitudes of the corresponding complex weights for the antennas. The controller 52 may perform the CCA calculations one antenna at a time by, for example, setting the variable gains associated with all other antennas to zero while processing a particular antenna. For example, if the receive beamformer 16 of FIG. 1 is used in the apparatus 40, to determine the CCA statistic for the first antenna 12, the controller 52 may first set the gain of variable gain unit 26 (associated with antenna 14) to zero. A packet may then be received by antenna 12 and processed through to the controller 52 which then calculates the CCA statistic for the first antenna 12. The controller 52 may then set the gain of variable gain unit 20 to zero and calculate the CCA statistic for the second antenna 14, and so on. The controller 52 may store the received signal for each antenna for later use. Other techniques for calculating the CCA statistics for each antenna of a multiple-antenna system may alternatively be used.

Once the CCA statistics have been determined for the receive antennas, the controller 52 may use this information to calculate the weight magnitudes for the antennas. In at least one embodiment of the present invention, for example, the weight magnitudes are made proportional to the square root of the mean of the CCA statistic for each receive antenna (although other techniques may alternatively be used), as shown below:

$$w^m = \sqrt{|a^m|} e^{j\theta_m}$$

This approach approximates maximal ratio combining (MRC), which is a well-known combining technique to maximize SNR at the output of multiple receive antennas. After the controller 52 has determined the weight magnitudes, it may then determine the appropriate weight angles. In at least one approach, the controller 52 may start with a number of different weight angle scenarios and then evaluate a performance metric for each scenario using the weight magnitudes determined previously. As used herein, a weight angle scenario is a particular arrangement of complex weight angles that may be applied to the antennas of the system at a particular time. For example, if the receive beamformer 16 of FIG. 1 is being used, an angle scenario may include a first phase shift value for phase shifter 22 and a second phase shift value for phase shifter 28. Alternatively, the angle scenario may be expressed as a phase difference between the phase shift value of phase shifter 22 and the phase shift value of phase shifter 28. In a system having three or more antennas, a phase shift scenario may be expressed as a phase difference to be used between each adjacent pair of antennas. Other methods for expressing angle scenarios may also be used.

The controller 52 may digitally estimate a performance metric (e.g., an output signal to noise ratio, an output signal magnitude, etc.) for a number of different angle scenarios, using the combined output as shown below:

$$y_n = \sum_{m=1}^{M} w^m y_n^m = e^{j\omega_0 n} \sum_{m=1}^{M} w^m (s_n^m + v_n^m)$$

The controller 52 may use the receive signals stored previously to perform this determination. The controller 52 may then select an angle scenario for use in the receive beamformer 46 based on the calculated performance metrics. For example, the controller 52 may select the angle scenario that results in the highest signal magnitude, etc.

After the weight magnitudes and angles have been determined, the controller 52 may deliver these values to the appropriate portions of the receive beamformer 46. As the weight magnitudes and angles will be in digital form, one or more digital-to-analog converters (DACs) may be used to generate analog values for the beamformer functionality (if needed). If the receive beamformer 16 of FIG. 1 is used, for example, a first gain control value may be delivered to the first variable gain unit 20, a second gain control value may be delivered to the second variable gain unit 26, a first phase shift control value may be delivered to the first phase shifter 22, and a second phase shift control value may be delivered to the second phase shifter 28. Other types of control values may need to be developed in systems using other receive beamformer architectures.

In at least one embodiment of the invention, one of the antennas in a multiple-antenna system will not have a phase shifter associated with it. For example, in the two antenna receive beamforming arrangement 10 of FIG. 1, in one possible implementation, the phase shifter 22 may be removed. In such a case, an angle scenario may include the phase shift value that will be applied to the other phase shifter 28 in the arrangement 10.

Figure 3:
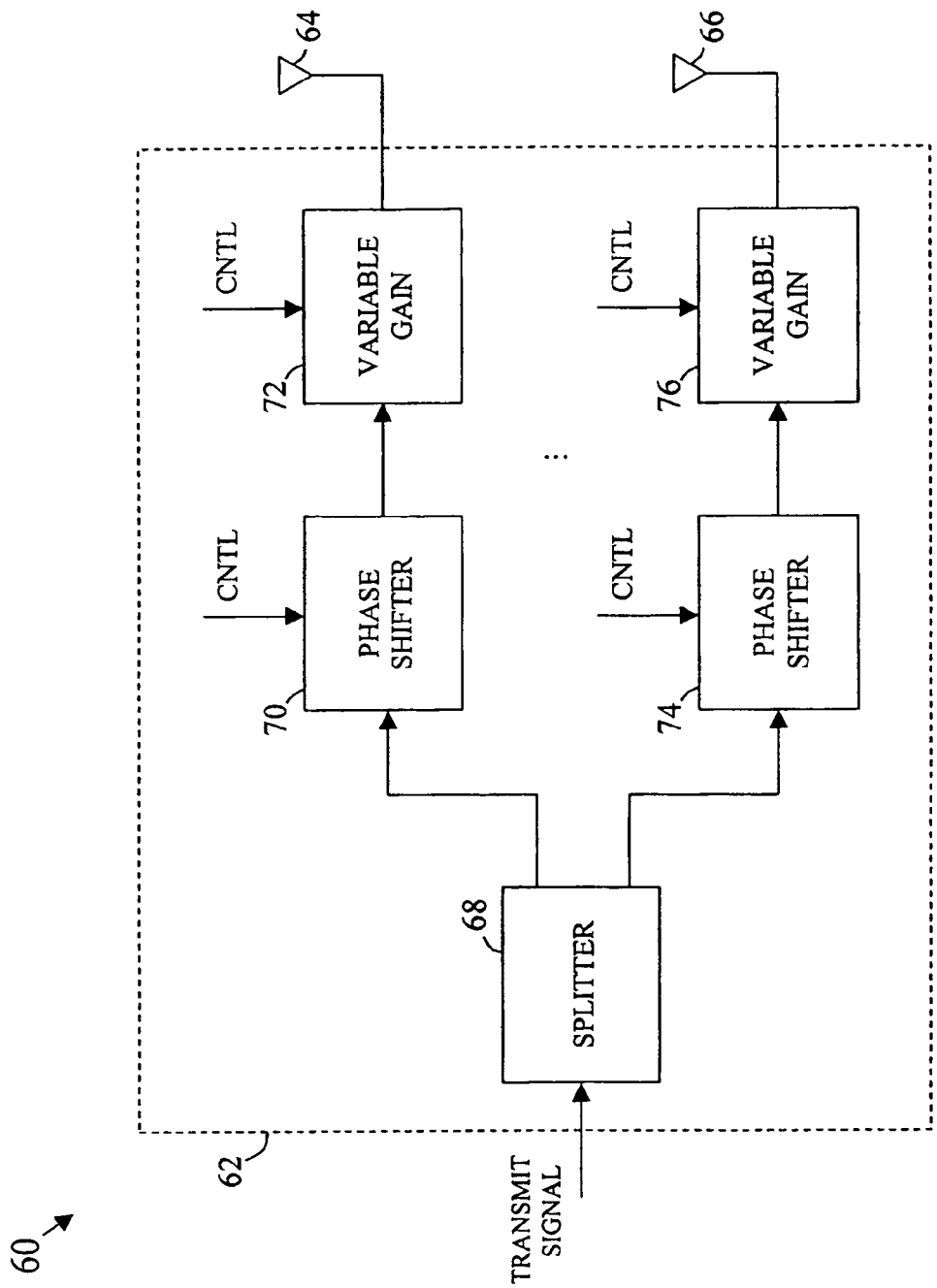
FIG. 3 is a block diagram illustrating an example transmit beamforming arrangement for use in a multiple-antenna wireless communication apparatus in accordance with an embodiment of the present invention.

FIG. 3 is a block diagram illustrating an example transmit beamforming arrangement 60 for use in a multiple-antenna wireless communication apparatus in accordance with an embodiment of the present invention. As illustrated, the transmit beamforming arrangement 60 includes a transmit beamformer 62 and at least two transmit antennas 64, 66. The transmit beamformer 62 may include: a splitter 68, a first phase shifter 70 and a first variable gain unit 72 that are associated with a first antenna 64, and a second phase shifter 74 and a second variable gain unit 76 that are associated with a second antenna 66. The splitter 68 splits a transmit signal amongst multiple paths to be transmitted by the multiple antennas. In at least one embodiment, the transmit signal is an analog signal that is received from a digital to analog converter (although digital signals may also be used). Upconversion to RF frequencies may be performed either before or after the splitter 68. In at least one implementation, the transmit signal may have both in-phase and quadrature components (e.g., in a system using QAM as a modulation technique). The first phase shifter 70 and the first variable gain unit 72 are operative for phase shifting and amplifying, respectively, a signal component to be transmitted by the first antenna 64. Likewise, the second phase shifter 74 and the second variable gain unit 76 are operative for phase shifting and amplifying, respectively, a signal component to be transmitted by the second antenna 66. The splitter 68 may include any structure or device for splitting a signal into multiple different paths.

One or more additional transmit antennas, with corresponding phase shifters and variable gain units, may be added to the transmit beamforming arrangement 60. In addition, it should be understood that other functionality may also be present within the transmit beamforming arrangement 60. For example, in at least one embodiment, some or all of the RF transmitter processing (e.g., upconversion, filtration, etc.) may be performed within each antenna channel after the splitter 68. Other modifications and variations are also possible. The variable gain units 72, 76 are each capable of providing a variable amount of gain to a corresponding transmit signal component in response to control information received at an input thereof. In at least one embodiment, the first and second variable gain units 72, 76 are power amplifiers having a controllable amount of gain. In other embodiments, a separate power amplifier may be provided, for example, between each variable gain unit 72, 76 and a corresponding antenna 64, 66. Other arrangements may alternatively be used. The phase shifters 70, 74 are each capable of providing a variable phase shift to a corresponding transmit signal component in response to control information received at an input thereof.

As in the receive beamforming arrangement 10 of FIG. 1, the example transmit beamforming arrangement 60 of FIG. 3 is capable of applying a complex weight W to the transmit signal components associated with each transmit antenna 64, 66. A controller (e.g., controller 52 of FIG. 2) may deliver corresponding control information to the appropriate units within the transmit beamformer 62 to apply the weights. In at least one embodiment of the invention, the same antennas may be used for both transmit and receive operations. Appropriate functionality (e.g., a duplexer structure) may be provided to allow the antennas to be shared. In such a case, the same weights that are applied during receive operations (or a derivative thereof) may also be applied during transmit operations involving the same remote entity.

Figure 4:
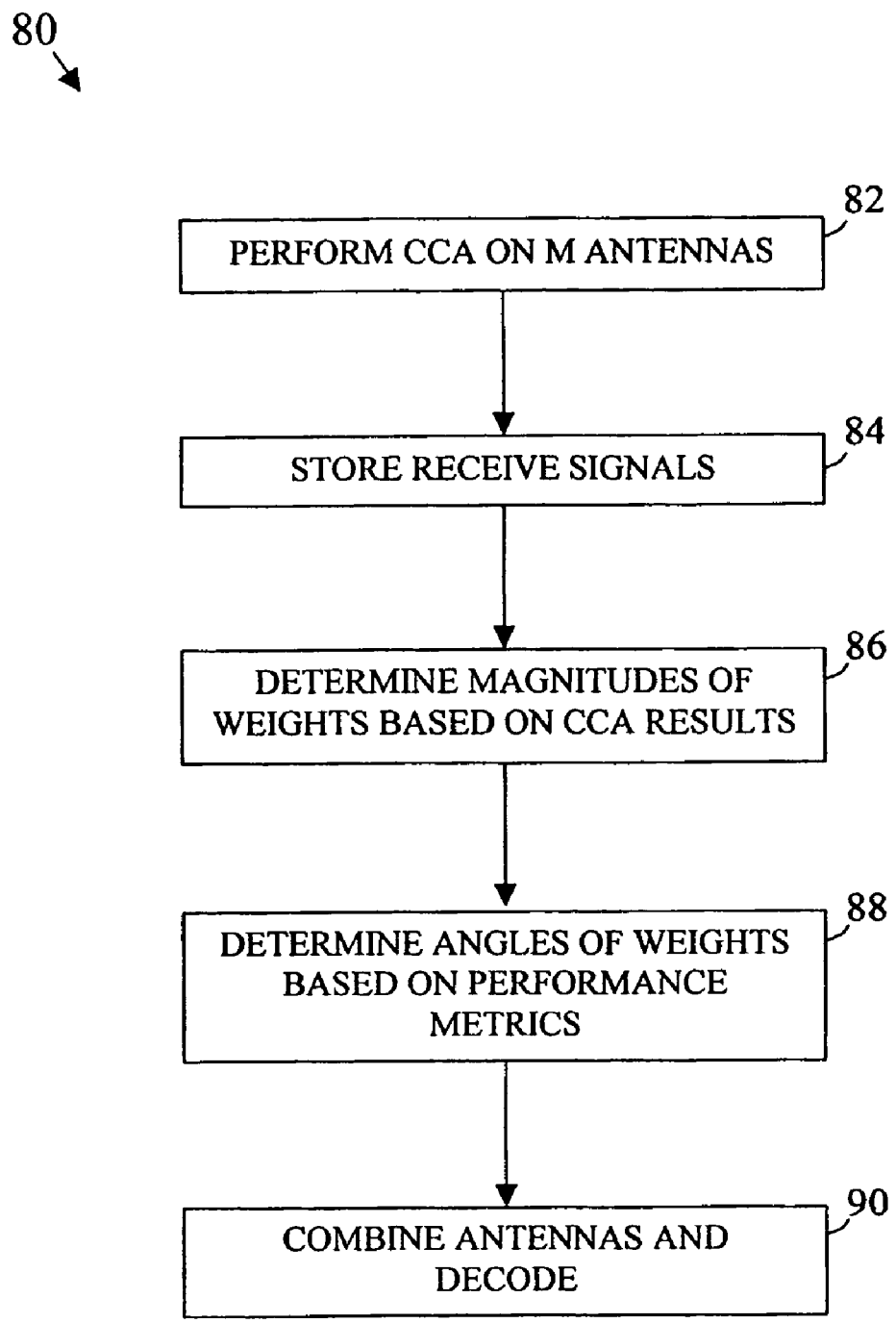
FIG. 4 is a flowchart illustrating an example method for use in determining and using complex antenna weights in a multiple-antenna system in accordance with an embodiment of the present invention.

FIG. 4 is a flowchart illustrating an example method 80 for use in determining and using complex weights in a multiple-antenna system in accordance with an embodiment of the present invention. The method 80 is adapted for use in a wireless networking environment that makes use of the clear channel assessment (CCA) function, as described previously (although other applications also exist). First, a CCA determination is made for each of M antennas using signals received by the M antennas (e.g., using the short preamble of received packets). The CCA determination may be made as described previously, or other techniques may be used. The signals received by the various antennas are stored (block 84). The magnitudes of the complex weights that will be used for the antennas are then determined based on the CCA results (block 86). In one possible approach, for example, each weight magnitude is made proportional to the mean of the CCA statistic for the corresponding antenna. Other techniques for determining the weight magnitudes based on the CCA results may alternatively be used.

The angles of the complex weights may next be determined based on performance metrics (block 88). For example, using the weight magnitudes determined above, a performance metric (e.g., signal magnitude, signal to noise ratio, etc.) may be estimated digitally for each of a number of different angle scenarios. An angle scenario that results in a best performance metric may then be selected as the weight angle scenario that will be used. The complex weights may then be applied in the corresponding receive beamformer, the antennas combined, and the resulting signal decoded (block 90). The weights may also be delivered to a transmit beamformer in the multiple-antenna system to support a subsequent transmit operation.

Figure 5:
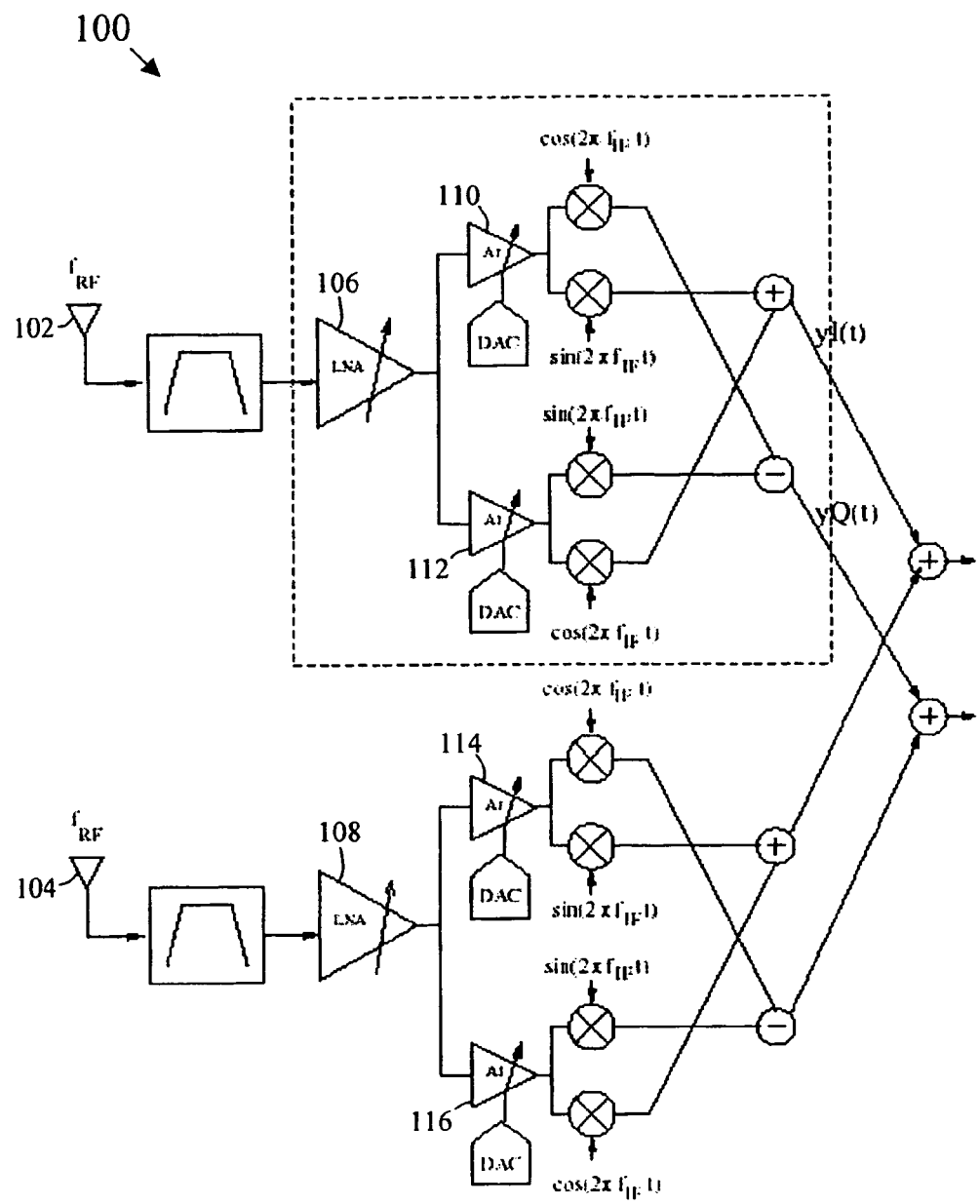
FIG. 5 is a block diagram illustrating a portion of a multiple-antenna wireless apparatus that may use features of the present invention.

In the receive beamformer 16 illustrated in FIG. 1, the complex weights are applied using variable gain units and variable phase shifters. It should be appreciated, however, that other methods for applying complex weights may alternatively be used. For example, in a system that uses separate in-phase and quadrature receive channels, the weights may be applied to complex IF in-phase and quadrature signals in a manner where only gain variation is used to apply the complex weights. FIG. 5 is a block diagram illustrating a portion of a multiple-antenna system 100 that uses such an approach. As shown, weight magnitudes associated with first and second antennas 102, 104 are applied using corresponding variable gain LNAs 106, 108. However, the weight angles are applied by appropriately controlling the gains of amplifiers 110, 112, 114, 116 feeding an IF downconversion stage for both in-phase and quadrature signals. Thus, once the complex weights have been determined for the system 100, the appropriate control signals may be determined for the LNAs 106, 108 and the amplifiers 110, 112, 114, 116 to apply the weights. As will be appreciated, many other techniques and architectures for applying complex weights in an analog fashion also exist.

The techniques and structures of the present invention may be implemented in any of a variety of different ways. For example, features of the invention may be embodied within portable computers, PDAs, cellular telephones and other handheld mobile communicators, pagers, wireless network interface cards (NICs) and other wireless network interface structures, integrated circuits, as instructions stored on machine readable media, and/or in other formats. Examples of different types of machine readable media that may be used include floppy diskettes, hard disks, optical disks, CD-ROMs, magneto-optical disks, ROMs, RAMs, EPROMs, EEPROMs, magnetic or optical cards, flash memory, and/or other types of media suitable for storing electronic instructions. In at least one implementation, features of the invention are embodied as a set of instructions that are modulated onto a carrier wave for transmission over a transmission medium.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method for use in determining complex antenna weights in a multiple-antenna wireless system, comprising:
    calculating clear channel assessment (CCA) information for multiple antennas;
    determining weight magnitudes for the multiple antennas using said CCA information, said weight magnitudes to be applied to receive signals associated with the multiple antennas within an analog beamformer;
    storing receive signals associated with the multiple antennas;
    determining performance metrics for the multiple-antenna wireless system for a plurality of different weight angle scenarios using said weight magnitudes and said stored receive signals; and
    selecting a weight angle scenario based on said performance metrics;
    wherein calculating CCA information includes calculating a correlation of a short preamble of a packet received by a first antenna with a reference that includes at least a portion of a known preamble sequence; and
    wherein determining performance metrics includes estimating a receive signal strength at an output of a combiner within the analog beamformer for the multiple-antenna wireless network system for a first weight angle scenario.

2. The method of claim 1, wherein:
    calculating CCA information includes calculating at least a partial autocorrelation of a signal received by a second antenna.

3. The method of claim 1, wherein:
    calculating CCA information includes calculating the mean of a CCA statistic for each of the multiple antennas.

4. The method of claim 1, wherein:
    determining weight magnitudes for the multiple antennas includes determining a weight magnitude for each antenna that is proportional to the square root of the mean of a CCA statistic for that antenna.

5. The method of claim 1, wherein:
    determining weight magnitudes for the multiple antennas includes determining weight magnitudes that approximate maximal ratio combining (MRC) coefficients.

6. The method of claim 1, wherein:
    selecting a weight angle scenario based on said performance metrics includes selecting a weight angle scenario that results in a best performance metric.

7. An apparatus comprising:

an analog receive beamformer to apply complex weights to receive signals associated with at least two antennas in response to control information, wherein said analog receive beamformer includes a combiner to combine said receive signals, said combiner having an output; and a controller to determine a clear channel assessment (CCA) value for each of said at least two antennas and to determine magnitudes for said complex weights based on said CCA values;

wherein said controller is programmed to determine a CCA value for one of said at least two antennas by temporarily setting complex weight magnitudes associated with each other of said at least two antennas to a relatively low value;

wherein said controller is programmed to determine a performance metric for the apparatus for each of a plurality of weight angle scenarios using stored receive signals and said magnitudes of said complex weights for said at least two antennas; and wherein said performance metric includes a combined receive signal to noise ratio (SNR) at the output of said combiner.

8. The apparatus of claim 7, wherein:

said analog receive beamformer includes:

a first variable gain unit to amplify a receive signal associated with a first antenna and a first variable phase shifter to apply a phase shift to said receive signal associated with said first antenna;

a second variable gain unit to amplify a receive signal associated with a second antenna and a second variable phase shifter to apply a phase shift to said receive signal associated with said second antenna; and a combiner to combine at least an amplified, phase shifted version of said receive signal associated with said first antenna and an amplified, phase shifted version of said receive signal associated with said second antenna.

9. The apparatus of claim 7, wherein:

said controller is programmed to determine a CCA value for a first antenna by calculating a correlation of a short preamble of a packet received by said first antenna with a reference that includes at least a portion of a known preamble sequence.

10. The apparatus of claim 7, wherein:

said controller is programmed to determine a CCA value for a first antenna by calculating at least a partial autocorrelation of a short preamble of a packet received by said first antenna.

11. The apparatus of claim 7, wherein:

said controller is programmed to determine a magnitude for a complex weight associated with a first antenna that is proportional to the square root of the mean of a CCA statistic for that antenna.

12. The apparatus of claim 7, wherein:

each weight angle scenario includes a weight angle corresponding to each of said at least two antennas.

13. The apparatus of claim 7, wherein:

said controller is programmed to select a weight angle scenario from said plurality of weight angle scenario for use in said analog receive beamformer based on said performance metrics.

14. The apparatus of claim 7, further comprising:

an analog transmit beamformer to apply complex weights to transmit signals associated with said at least two antennas in response to control information, wherein said controller causes said analog transmit beamformer to apply the same weights to the transmit signals associated with said at least two antennas that are applied to the receive signals associated with said at least two antennas.

15. An article comprising a computer readable storage medium having instructions stored thereon that, when executed by a computing platform, operate to:

calculate clear channel assessment (CCA) information for multiple antennas in a multiple-antenna wireless system;

determine complex weight magnitudes for the multiple antennas using said CCA information, said complex weight magnitudes to be applied to receive signals associated with the multiple antennas within an analog beamformer;

store receive signals associated with the multiple antennas;

determine performance metrics for the multiple-antenna wireless system for a plurality of different weight angle scenarios using said complex weight magnitudes and said stored receive signals; and select a weight angle scenario based on said performance metrics;

wherein said performance metrics include estimated receive signal strengths at an output of a combiner within said analog beamformer.

16. The article of claim 15, wherein:

said complex weight magnitudes include a weight magnitude for each antenna that is proportional to the square root of the mean of a CCA statistic for that antenna.

17. A system comprising:

at least two dipole antennas;

an analog receive beamformer to apply complex weights to receive signals associated with said at least two dipole antennas in response to control information, wherein said analog receive beamformer includes a combiner to combine said receive signals, said combiner having an output; and a controller to determine a clear channel assessment (CCA) value for each of said at least two dipole antennas and to determine magnitudes for said complex weights based on said CCA values;

wherein said controller is programmed to determine a performance metric for the system for each of a plurality of weight angle sets using stored receive signals and said magnitudes of said complex weights for said at least two antennas; and wherein said performance metric includes a combined receive signal to noise ratio (SNR) at the output of said combiner.

18. The system of claim 17, wherein:

said controller is programmed to determine magnitudes for said complex weights that are proportional to corresponding CCA values.

19. The system of claim 17, wherein:

said controller is programmed to select a weight angle set from said plurality of weight angle sets for use in said analog receive beamformer based on said performance metrics.

* * * * *